United States Patent
Patmont et al.

(10) Patent No.: US 7,100,729 B2
(45) Date of Patent: Sep. 5, 2006

(54) SUSPENSION APPARATUS FOR SCOOTER UTILIZING OFFSET FRAME WITH TORSION SHOCK ABSORBER

(75) Inventors: Steven J. Patmont, Gardnerville, NV (US); Jim Robbins, San Francisco, CA (US)

(73) Assignee: Patmont Motor Werks, Inc., Minden, NV (US)

( * ) Notice: Subject to any disclaimer, the term of this patent is extended or adjusted under 35 U.S.C. 154(b) by 0 days.

(21) Appl. No.: 11/082,211

(22) Filed: Mar. 15, 2005

(65) Prior Publication Data

US 2005/0205326 A1    Sep. 22, 2005

Related U.S. Application Data

(60) Provisional application No. 60/554,671, filed on Mar. 16, 2004.

(51) Int. Cl.
  *B62D 61/02*    (2006.01)
(52) U.S. Cl. ........................................ 180/181; 180/227
(58) Field of Classification Search ................ 180/180, 180/181, 219, 227, 228, 205, 206; 280/87.041, 280/87.043, 87.03, 87.021
  See application file for complete search history.

(56) References Cited

U.S. PATENT DOCUMENTS

| 5,277,450 | A | | 1/1994 | Henschen |
| 5,411,287 | A | * | 5/1995 | Henschen ............ 280/124.169 |
| 6,012,539 | A | | 1/2000 | Patmont |
| 6,273,205 | B1 | * | 8/2001 | Tsai ............................ 180/181 |
| 6,338,393 | B1 | * | 1/2002 | Martin ........................ 180/227 |
| 6,668,959 | B1 | * | 12/2003 | McDermott et al. ........ 180/206 |
| 6,752,229 | B1 | * | 6/2004 | Ho ............................. 180/181 |
| 6,830,255 | B1 | * | 12/2004 | Cheng ..................... 280/87.041 |
| 2003/0085067 | A1 | * | 5/2003 | Martin ........................ 180/181 |
| 2003/0213633 | A1 | * | 11/2003 | McDermott et al. ........ 180/227 |
| 2004/0016582 | A1 | * | 1/2004 | Ho ............................. 180/181 |
| 2004/0129472 | A1 | * | 7/2004 | Cheng ........................ 180/181 |
| 2005/0056476 | A1 | * | 3/2005 | Jung .......................... 180/181 |

* cited by examiner

*Primary Examiner*—J. Allen Shriver
(74) *Attorney, Agent, or Firm*—Townsend and Townsend and Crew LLP

(57) ABSTRACT

A motor powered scooter for supporting a standing rider has an improved torsion acting shock absorbing mount for the cantilevered shock absorbing support of at least one of the scooter wheels from the frame. At least one torsion acting shock absorber is utilized. In a preferred embodiment, the torsion acting shock absorber includes a square sectioned metal tube, a correspondingly square sectioned metal shaft, and confined compressible rubber rods acting there between. The torsion acting shock absorber is attached at right angles to the main structural tube and protrudes at an end to one side of the main structural tube. A cantilevered wheel support is mounted offset from the main structural tube at the end of the shock absorber remote from the main structural tube. A shock absorbing suspension is disclosed for both the front steered wheel and the rear driven wheel.

5 Claims, 5 Drawing Sheets

SUSPENSION APPARATUS FOR SCOOTER UTILIZING OFFSET FRAME WITH TORSION SHOCK ABSORBER

CROSS-REFERENCES TO RELATED APPLICATIONS

This application is an application claiming benefit under 35 USC 119(e) of Ser. No. 60/554,671 filed Mar. 16, 2004.

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

This invention relates to scooters. More particularly, this invention relates to a scooter suspension adaptable to so-called offset frames where torsion shock absorbers provide both the required frame offset from which cantilevered wheels can be mounted and from which shock absorbing movement of one part of the scooter frame relative to another part of the scooter frame can occur.

BACKGROUND OF THE INVENTION

All-terrain scooters are known. See Patmont U.S. Pat. No. 6,012,539. The "all-terrain" scooter disclosed therein is provided with a large central tubular chassis having two central brackets supporting a platform. At the front, the tubular chassis bends upward through a notch in the platform upwardly and above the front wheel to support a steering wheel head tube. At the rear, the tubular frame is offset to one side of the chassis for one-sided cantilevered support of the rear driven wheel, this cantilevered support providing for economic manufacture. From this rear portion of the frame, pivotal and cantilevered mounting of an engine having a protruding shaft with a tire driving surface occurs. Generally, the scooter is driven on enlarged tires with its principal use being off-road, typically over rough terrain.

This scooter has found extensive use in both sporting and off-road patrol functions. Regarding such sporting functions, racing and jumping in both organized and unorganized individual and team competition now regularly occurs. Likewise, in off-road patrol functions, the scooter is typically transported in the trunk of the car or the bed of the truck to the end of a road, lifted from its transported disposition, assembled, and used for transport of a patrolling officer to locations where his car or truck can not take him. In either event, improved all-terrain performance is required. In order for such all-terrain performance to occur, the ability to soften the impact of scooter takeoff and landing from terrain obstacles, such as rocks, potholes, and the like, have been required.

Referring to Martin U.S. Pat. No. 6,338,393, the rear driving wheel is shown mounted to a support bracket pivotal with respect to the rear portion of a scooter. A shock absorber extends between the scooter platform and a point above the scooter platform on the pivoting support bracket. The shock absorber absorbs energy by undergoing compression upon impact of the rear driven wheel of the scooter with the ground.

It is also known to use essentially the same arrangement and have the shock absorber extend between a pivot point underlying the platform and a lower and protruding portion of the rear wheel supporting frame.

Both arrangements have their disadvantages. Where the shock absorber is mounted above the platform, both the mount and the shock absorber are exposed to the foot of the rider. Interference with the rider's firm footing on the platform can occur. Further, the feet of the rider can be knocked out of position on the platform or the feet of the rider can damage the shock absorber. Where the shock absorber is mounted below the platform, the shock absorber is inevitably exposed to the underlying irregular terrain. Where the shock absorber is exposed to the underlying irregular terrain, the inevitable particulate matter impacting the shock absorber can interfere with shock absorber operation and even damage the shock absorber to the point of inoperability.

In both of the above examples, the shock absorber must move relative to the platform and undercarriage of the scooter during shock absorbing motion. This required motion increases the profile required for shock absorber operation relative to the top and/or bottom of the scooter.

Torsion acting shock absorbers are known. In Henschen U.S. Pat. Nos. 5,277,450 and 5,411,287, there is disclosed a torsion axle for use as a shock absorber with trailers. Specifically, square sectioned torsion shafts, square sectioned metal tubes and a plurality of resilient rubber rods acting between the square sectioned torsion shafts and metal tubes are utilized. The resilient rubber rods are confined between the square sectioned metal tubes and the square sectioned metal shafts so as to be compressed by the square sectioned metal shaft when the square sectioned metal shaft rotates relatively to the square sectioned metal tubes. The resilient rubber rods come under compression and torsionally resist rotation of the square sectioned shafts. In a typical application, the metal tubes are attached to the trailer. The torsion shafts are attached to the wheels by an eccentric crank, which eccentric crank is off center with respect to a line extending vertically from the axis of rotation of the wheel vertically upward normal to the trailer. The crank extends outwardly and away from the metal tubes so that the wheels are supported outwardly and away from both the torsion axle and the trailer. When the trailer encounters shock inducing bumps along its path of travel, shock absorbing movement of the crank mounted wheel occurs.

We have a previous shock absorber arrangement designed for a motor powered scooter. In Patmont U.S. Pat. No. 6,668,959 issued Dec. 30, 2003 entitled Scooter with Integral Frame Mounted Shock Absorber, there is disclosed a motor powered scooter for supporting a standing rider that has a front steered wheel, a rear driven wheel, and a platform there between that supports a standing rider on the scooter. The platform is disposed substantially horizontally along a longitudinal axis, and in the preferred embodiment has a main structural tube disposed in supporting relation under the platform. A shock absorber having first and second relatively moving ends for energy absorbing movement is fastened in fixed relation to the underside of the platform with one of the relatively moving ends disposed to and toward the rear driven wheel. In a preferred embodiment, the shock absorber is protectively encased and held within the main structural tube underlying and supporting the platform. A rear frame is provided for supporting the rear driven wheel. This rear frame is connected at a pivot relative to the platform. A linkage has a first connection to the rear frame offset from the pivot. This linkage connects at a second connection at the relatively moving end of the shock absorber. The pivot of the driving wheel supporting frame relative to the platform causes energy absorbing shock absorber movement.

Discovery of Design Criteria

From the standpoint of an economically manufactured and functioning scooter, two design requirements are desirable. First, for the economical manufacture of the scooter, the wheels must be cantilevered with respect to the frame. Traditional fork mounting of either the front or rear axle is to be avoided.

Second, for the functioning of the scooter, it is required that the shock absorber be confined in a completely protected manner while at the same time functioning to dampen the inevitable shock which the scooter undergoes during use. It will be seen that the following disclosed design, enables these design requirements.

Insofar as the prior art does not suggest nor specifically disclose the desirability of these two design requirements, invention is claimed. The reader will understand that determining design requirements as well as meeting those design requirements can constitute invention.

BRIEF SUMMARY OF THE INVENTION

A motor powered scooter for supporting a standing rider includes a front steered wheel, a rear driven wheel, and a platform that supports a standing rider on the scooter. A main structural tube is disposed substantially horizontally along a longitudinal axis for supporting the front steered wheel at a forward end of the main structural tube, for supporting the rear driven wheel at the rear end of the main structural tube, and for supporting a platform between the wheels on which a standing rider controls and steers the scooter. An improved torsion acting shock absorbing mount is disclosed for the cantilevered shock absorbing support of at least one of the scooter wheels from the frame. At least one torsion acting shock absorber is utilized. In a preferred embodiment, the torsion acting shock absorber includes a square sectioned metal tube, a correspondingly square sectioned metal shaft, and confined compressible rubber rods acting there between. The torsion acting shock absorber is attached at right angles to the main structural tube and protrudes at an end to one side of the main structural tube. A cantilevered wheel support is mounted offset from the main structural tube at the end of the shock absorber remote from the main structural tube. In the preferred embodiment, the square tube fastens at right angles to the main structural tube while the square metal shaft connects to the cantilevered wheel support. The cantilevered wheel support torsion rotates through the shock absorber at right angles with respect to the main structural tube to undertake shock absorbing movement between at least one of the wheels and the main structural tube, platform, and scooter rider. In preferred embodiments, provision is made for applying the shock absorber between the cantilevered driving wheel, the cantilevered steering wheel, or both. The economical manufacture of the scooter with cantilevered wheel mounting is enabled together with protected mounting of the torsion acting shock absorber during scooter operation.

An advantage of this invention is that the shock absorber naturally disposes the cantilevered wheel mount away from the main structural tube. By the expedient of cantilevering the wheel from the cantilevered wheel mount back into alignment with the axis of the main structural tube, an economically constructed and wheel aligned motorized scooter results.

A further advantage of this invention is that the torsion acting shock absorber is completely self-contained and protected from the elements.

DETAILED DESCRIPTION OF THE INVENTION

Figure 1:
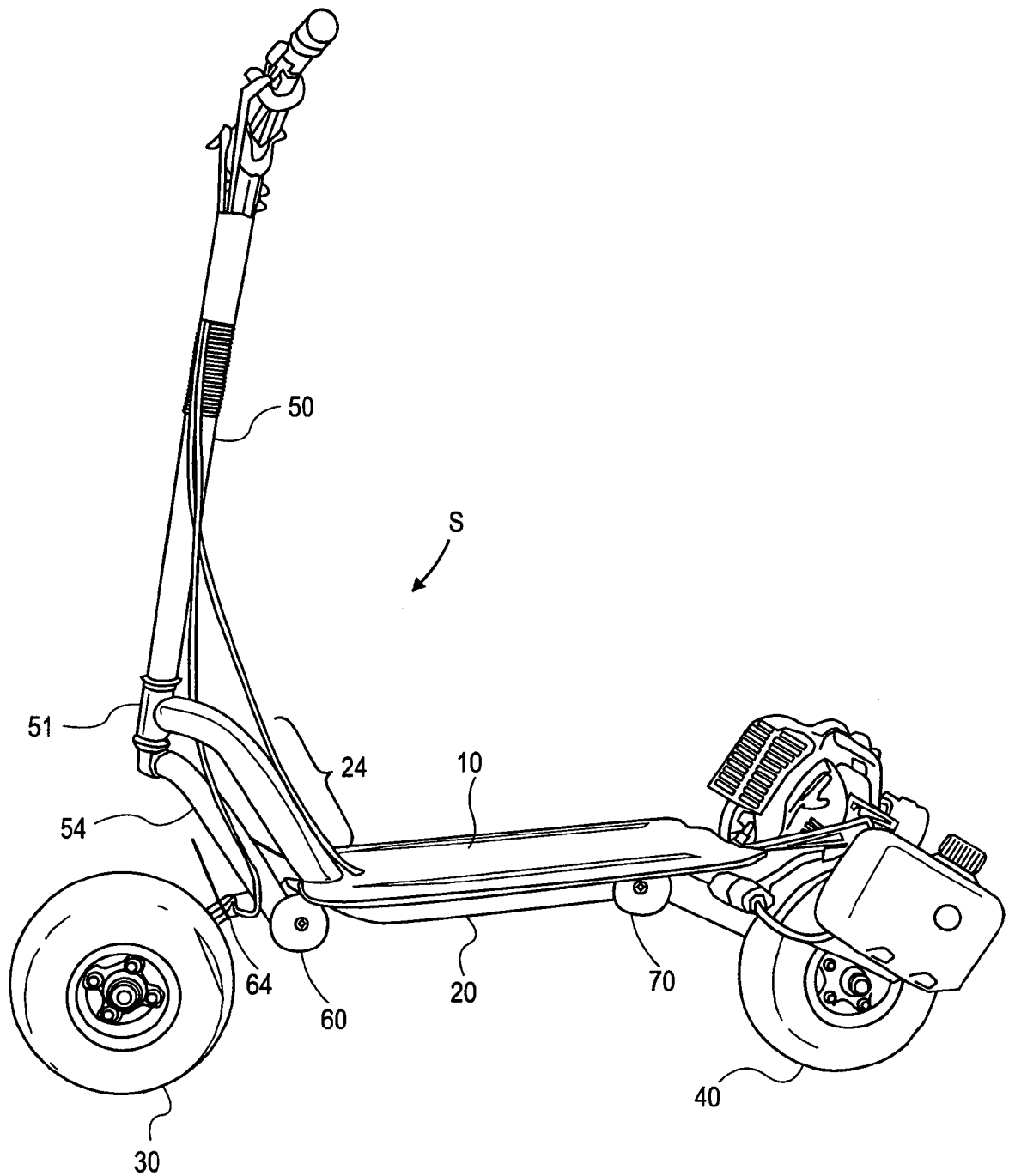
FIG. 1 is a perspective side elevation of a motorized scooter constructed in accordance with this invention illustrating a scooter embodiment in which both the front steered wheel and the rear driven wheel are provided with the torsional shock absorber for the cantilevered mount of the scooter wheels.

Referring to FIG. 1, scooter S is shown having platform 10, main structural tube 20, front steered wheel 30, rear driven wheel 40 and upwardly extending steering handle 50. Simply stated, a rider stands on platform 10, steers steering handle 50, and operates throttle and brake controls mounted to handle 50 for scooter operation. In the view here shown, first torsion shock absorber 60 mounts steered wheel 30 to steering handle 50 and main structural tube 20 while a second torsion shock absorber 70 mounts motor driven wheel 40 to main structural tube 20.

Figure 2:
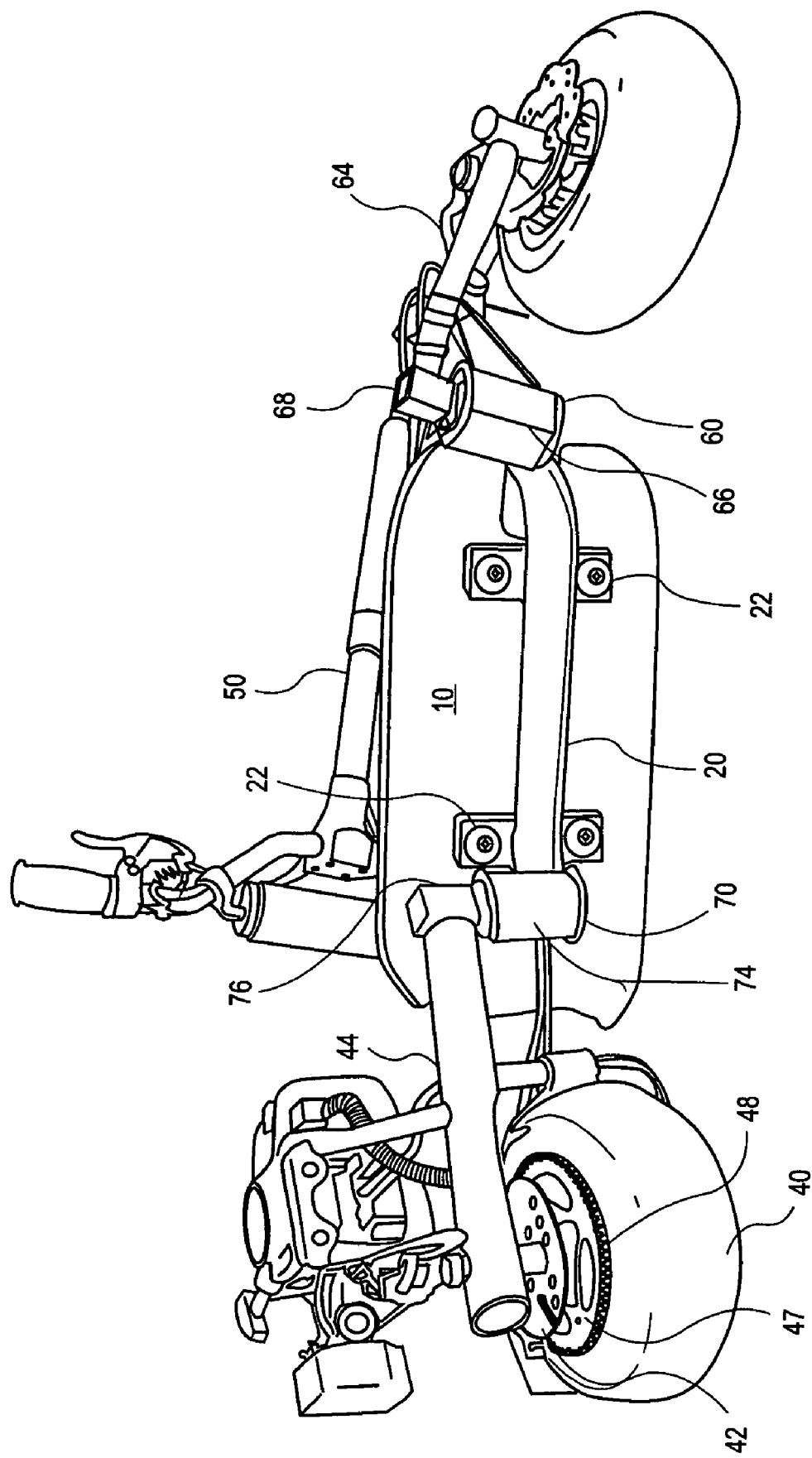
FIG. 2 is a perspective bottom view of the motorized scooter of FIG. 1 illustrating the main structural tube, the platform supported on the main structural tube, the cantilevered mount of the rear driven wheel, and the cantilevered mount of the front steered wheel.

Having set forth the main elements of this invention, attention can be devoted to the bottom perspective view illustrated in FIG. 2 which conveniently illustrates the difference between the suspension system applied to the front steered wheel 30 and the rear driven wheel 40. First, main structural tube 20 supports platform 10 at respective screw pads 22. As shown in FIG. 1, structural tube 20 bends arcuately upward at arcuate bend 24 terminating at neck 51. It is from neck 51 that steered wheel 30 is controlled.

Main structural tube 20 and its underlying platform 10 attach to second torsion shock absorber 70. It is from this end of main structural tube 20 that second torsion shock absorber 70 mounts powered wheel 40.

Figure 3:
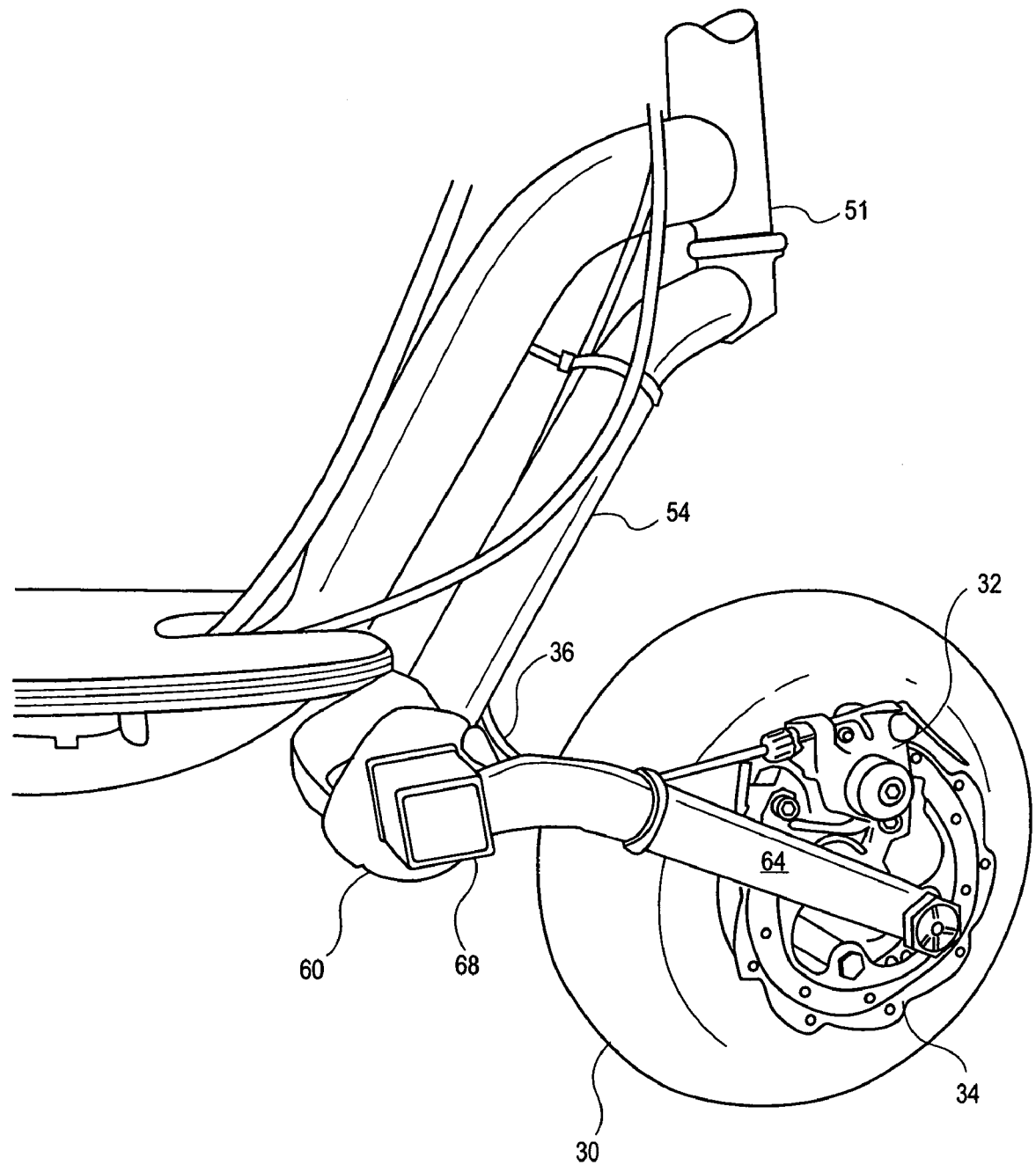
FIG. 3 is an expanded side elevation of the cantilevered mount of the front steered wheel here illustrating the steering tube, the under platform mount of the torsional shock absorber, and the cantilevered mount of the front steered wheel including the disposition of a disk brake on the front steered wheel.

Referring to both FIGS. 1 and 2, it will be seen that front steered wheel 30 connects to upwardly extending steering handle 50 at a rotatable mount within neck 51. Steering handle 50 connects through to steering wheel offset arm 54. Referring briefly back to FIG. 1, it will be seen that arm 54 has first torsion shock absorber 60 mounted at the bottom end thereof. Referring to FIG. 2, it will be seen that the first torsion shock absorber 60 attaches at its outer end to steering wheel cantilever arm 64. Operation of steered wheel 30 is easy to understand. As upwardly extending steering handle 50 is rotated within neck 51, steering wheel offset arm 54, first torsion shock absorber 60, and steering wheel cantilever arm 64 all rotate together to steer steered wheel 30. Referring to FIG. 3, it will be seen that steering wheel offset arm 54 has a bend complementary to arcuate bend 24 of main structural tube 20 (See FIG. 1).

The cantilevered mount of steered wheel 30 can be easily identified with respect to FIGS. 2 and 3. Specifically, disk brake 32 mounted within shield 34 is controlled through cables 36 which extend upwardly of steered handle 50. Disk brake 32 is mounted between steered wheel 30 and steering wheel cantilever arm 64. It is to be noted that first torsion shock absorber 60 has its square tube 66 attached at the bottom of steering wheel offset arm 54. Likewise, first torsion shock absorber 60 has its square shaft 68 attached to steering wheel cantilever arm 64. The reader will understand that the respective positions of the square tube 66 and the square shaft 68 could as well be reversed.

Figure 4:
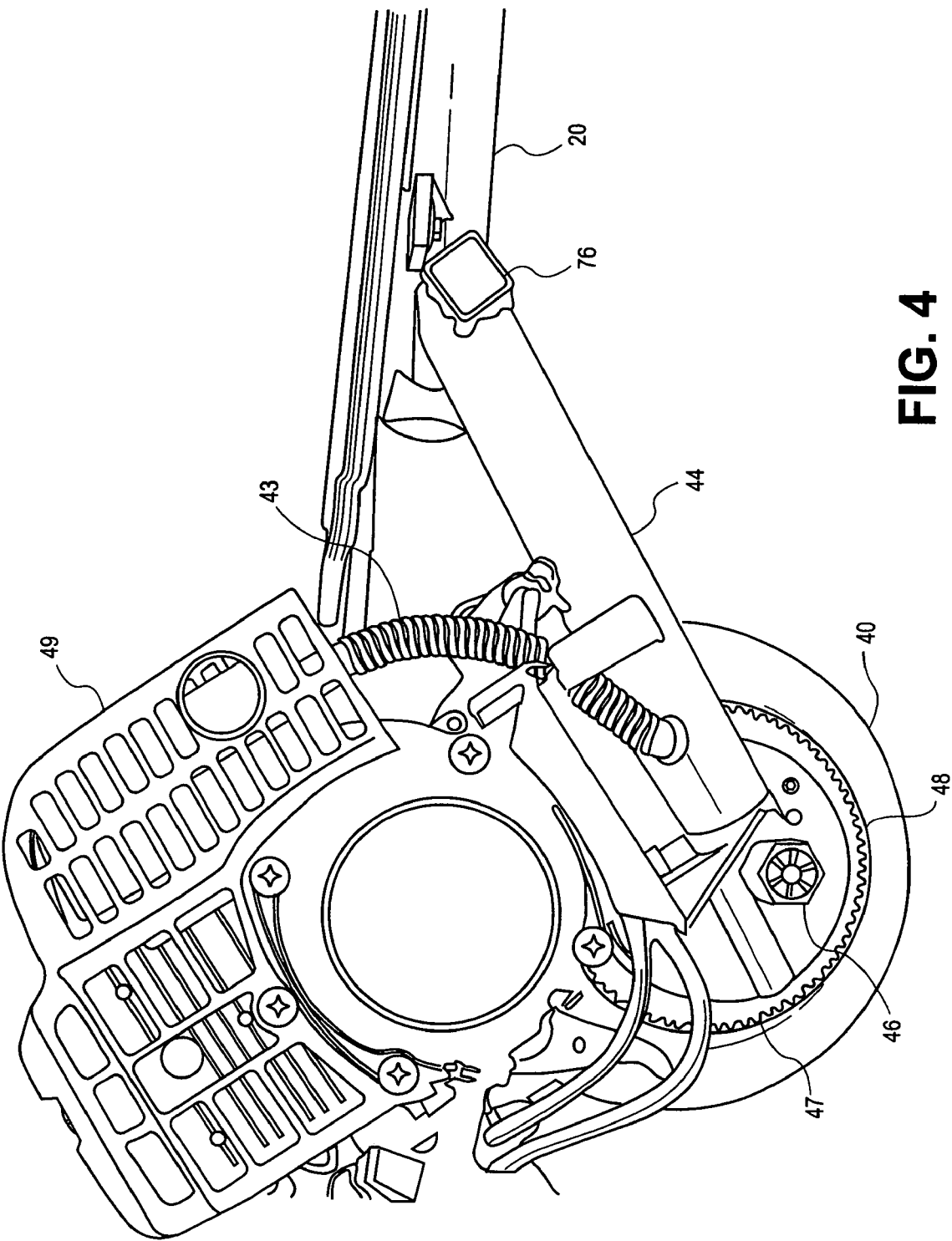
FIG. 4 is an expanded side elevation of the cantilevered mount of the rear powered wheel here illustrating the rear cantilevered motor mounting and wheel mounting tube further illustrating the overlying motor and underlying rear driven wheel with its coaxially mounted sprocket driven from an overlying motor sprocket (schematically shown); and, FIG. 5 is a typical detail of a cross-section of the torsion shock absorber of the preferred embodiment of this invention.

Referring to FIGS. 2 and 4, mounting of the rear driven wheel 40 is illustrated. Second torsion shock absorber 70 fastens to the rear of main structural tube 20. Square tube 74 is welded at its exterior to the end of the main structural tube 20. Square shaft 76 protrudes from second torsion shock absorber 70 and has a rear cantilever arm 44 mounted thereto. A single cantilever mount 46 mounts concentric sprocket 47, chain 48, overlying a driven sprocket (not shown) powered by engine 49. As can be seen clearly in FIG. 2, concentric sprocket 47 driven by chain 48 is placed between the driven wheel 40 and rear cantilever arm 44. As is known, cantilever arm 44 serves as portion of a muffler having exhausted conduit 43 from the engine 49 lead into cantilever arm 44. It will be further observed that the scooter here shown includes a rear disk brake 42 between powered wheel 40 and cantilever arm 44, which disk brake 42 is cable operated from steering handle 50. Likewise, the throttle to engine 49 is cable operated from steering handle 50. It is to be noted that in FIG. 2, steering handle 50 is shown in a folded position, a position well known for this type of scooter device.

Figure 5:
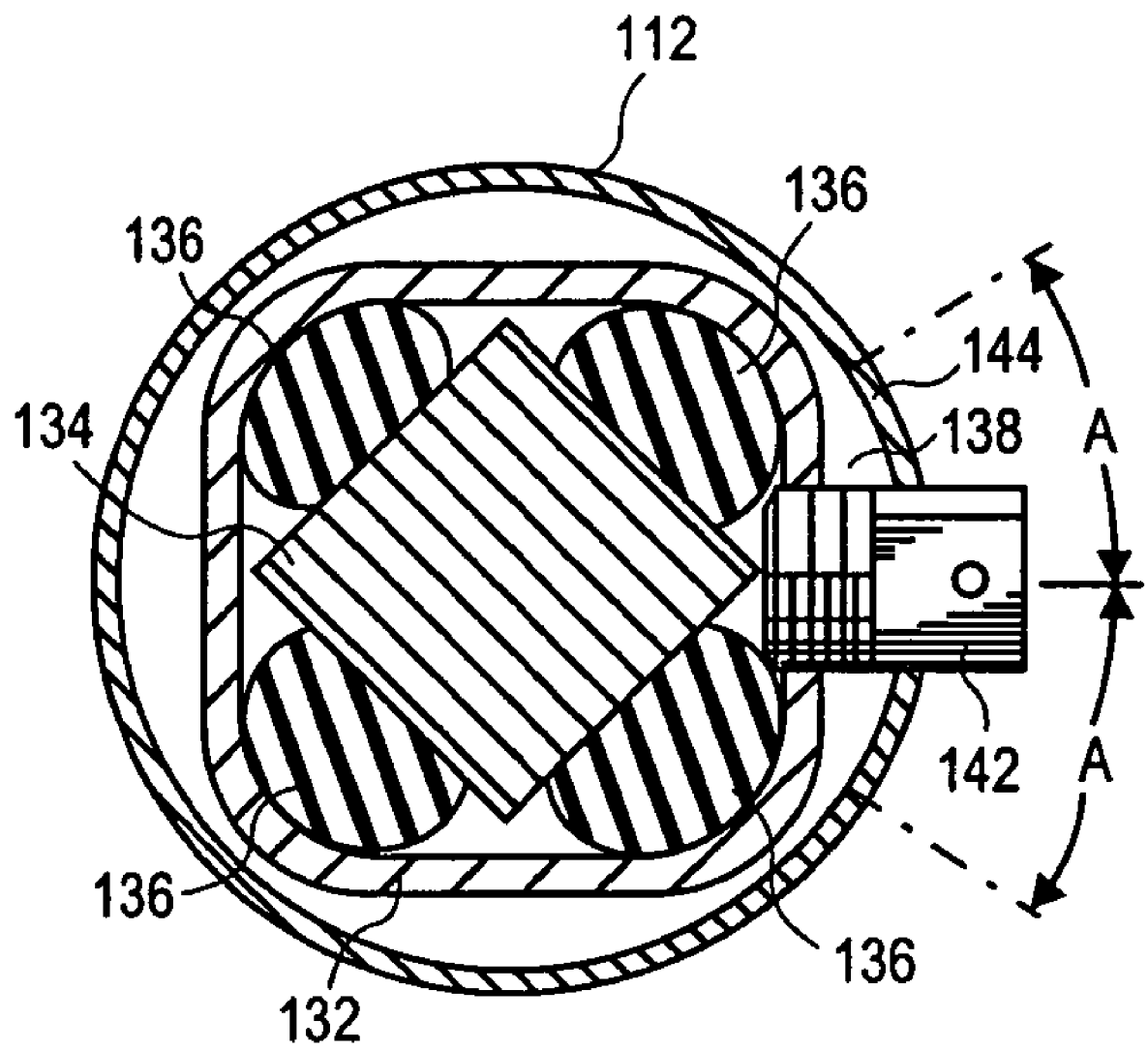

Referring to FIG. 5, a typical torsion shock absorber is shown. Tube 112 contains square tube 132. Tube 132 has square section shaft 134 extending centrally thereof. Rubber tubes 136 are trapped between the respective sides of square section shaft 134. Rotation of shaft 134 compresses rubber tubes 136 with resultant shock absorption. It can be seen that tube 112 is slotted between slots 144 extending through an angle of 2A. Shaft 142 rotates squared tube 132 enabling shock absorbing movement to occur.

Shock absorbers of the type illustrated in FIG. 5 are readily available on a commercial basis. For example, such shock absorbers may be purchased from QDS Henschen Inc. of Jackson Center, Ohio.

What is claimed is:

1. A motor powered scooter for supporting a standing rider includes
    a main structural tube disposed substantially horizontally along a longitudinal axis,
    a platform supported on a main structural tube disposed substantially horizontally along the longitudinal axis
    a front steered wheel supported from the forward end of the main structural tube,
    a rear driven wheel supported from the rear end of the main structural tube,
    the improvement comprising a torsion acting shock absorber for the cantilevered shock absorbing support of at least one of the scooter wheels from the main structural tube comprising:
    a torsion acting shock absorber attached at right angles to the main structural tube and protruding to one side of the main structural tube;
    a cantilevered wheel support mount offset from the main structural tube at the end of the shock absorber remote from the main structural tube;
    the cantilevered wheel support mounted for torsion acting shock absorber rotation through the shock absorber normal to the main structural tube to undertake shock absorbing movement between at least one of the wheels and the main structural tube, platform, and scooter rider.

2. The motor powered scooter for supporting a standing rider according to claim 1 and wherein:
    the torsion acting shock absorber extends between the main structural tube and the rear driven wheel.

3. The motor powered scooter for supporting a standing rider according to claim 1 and wherein:
    the torsion acting shock absorber extends between the main structural tube and the front steered wheel.

4. The motor powered scooter for supporting a standing rider according to claim 1 and wherein:
    the torsion acting shock absorber includes a square sectioned metal tube, a correspondingly square sectioned metal shaft, and confined compressible rubber rods acting there between.

5. The motor powered scooter for supporting a standing rider according to claim 4 and wherein:
    the square sectioned metal tube is fastened at right angles to the main structural tube.

* * * * *